United States Patent
Cohen et al.

(10) Patent No.: US 6,708,573 B1
(45) Date of Patent: Mar. 23, 2004

(54) PROCESS FOR FILLING COMPRESSED GAS FUEL DISPENSERS WHICH UTILIZES VOLUME AND DENSITY CALCULATIONS

(75) Inventors: Joseph Perry Cohen, Bethlehem, PA (US); Paul Anthony Mattiola, Coopersburg, PA (US); David John Farese, Riegelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 13 days.

(21) Appl. No.: 10/242,585

(22) Filed: Sep. 12, 2002

(51) Int. Cl.[7] .................................................. G01G 9/00
(52) U.S. Cl. ....................................................... 73/865
(58) Field of Search ............................... 73/865, 861.01, 73/861.02, 861.03, 861.71, 30.01; 702/44

(56) References Cited

U.S. PATENT DOCUMENTS

| | | | |
|---|---|---|---|
| 1,020,127 A | | 3/1912 | Coleman |
| 3,603,155 A | * | 9/1971 | Morris et al. ............ 73/863.01 |
| 3,776,034 A | * | 12/1973 | Kolb ...................... 73/861.03 |
| 3,906,198 A | * | 9/1975 | November ................... 702/46 |
| 3,934,473 A | | 1/1976 | Griffo ....................... 73/231 |
| 4,411,161 A | * | 10/1983 | November ............... 73/861.03 |
| 4,506,541 A | * | 3/1985 | Cunningham ............... 73/32 R |
| 4,881,412 A | * | 11/1989 | Northedge ............... 73/861.04 |
| 5,035,139 A | * | 7/1991 | Hoefelmayr et al. ......... 73/223 |
| 5,056,034 A | * | 10/1991 | Rucki et al. ................. 702/46 |
| 5,396,806 A | * | 3/1995 | Dechene et al. ......... 73/861.04 |
| 2003/0130808 A1 | * | 7/2003 | Kapitulskiy et al. .......... 702/45 |

FOREIGN PATENT DOCUMENTS

DE      WO 01/98736 A1  * 12/2001   ........... G01F/1/684

* cited by examiner

Primary Examiner—Hezron Williams
Assistant Examiner—Charles Garber
(74) Attorney, Agent, or Firm—Keith D. Gourley

(57) ABSTRACT

A process for measuring a total mass of a pressurized fluid flowing through a conduit is provided which includes measuring a first volume, temperature and pressure of the fluid during a first timed interval of a sequence of timed intervals, calculating a first mass during the first timed interval by applying the first temperature and pressure to an equation of state to determine a first density and multiplying the first density by the first volume to determine the first mass, measuring a second volume, temperature and pressure of the fluid during a second timed interval, calculating a second mass during the second timed interval by applying the second temperature and pressure to the equation of state to determine a second density and multiplying the second density by the second volume to determine the second mass, and calculating the total mass of the fluid by summing the first and second masses.

4 Claims, 2 Drawing Sheets

PROCESS FOR FILLING COMPRESSED GAS FUEL DISPENSERS WHICH UTILIZES VOLUME AND DENSITY CALCULATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention is directed to a process for measuring a total mass of a pressurized fluid flowing through a volume. More particularly, the present invention is directed to an automated fill process for filling vehicles with compressed gas which uses a density calculation combined with a volume flow meter to accurately measure a mass of compressed gas delivered.

Fueling of compressed gas powered vehicles, such as hydrogen (in particular, $H_2$) fuel cell powered vehicles, can be done rapidly by discharging the gas from stored higher pressure vessels into on-board storage vessels. It is imperative that the mass of compressed gas be measured and delivered with an accuracy of better than 1.5% in order to meet the requirements of the various state bureaus of weights and measures. Coriolis effect mass meters are typically used when fueling natural gas vehicles (NGVs). The wide range of flow rates, and the high pressures that are used in this process, make it difficult to identify an appropriate flow meter. In addition, hydrogen vehicles require higher storage pressures than NGVs. As higher supply pressures are used to fill vehicles, it becomes increasingly difficult to find appropriate flow meters that can handle the required flow rates and pressures at the required accuracy. An objective of this invention is to provide an accurate method of mass flow measurement for compressed gas, for example, hydrogen compressed gas, dispensing systems at high pressures.

Installations of compressed gas hydrogen fueling stations have been very limited to date, and none is known to have met national and state standards requirements.

In Canadian Patent No. 1,208,742 (Benner), a system is taught for automatically filling a vehicle with compressed gas. A mass measuring means is used, but its particular function is not described. However, known commercially available NGV dispensers, which claim to meet various national and state standards requirements, typically rely on Coriolis effect meters for mass measurement. Therefore, particularly in light of the fact that this patent issued in 1986, the invention here also is likely to have intended to use Coriolis effect meters.

Turbine meters, in general, are not new. For example, a patent from 1912, U.S. Pat. No. 1,020,127 (Coleman), describes a "fluid meter" which is directed to what is now known as a turbine meter. In a turbine meter such as that described in the Coleman patent, a turbine impeller is rotationally mounted in a fluid tight casing. The turbine impeller is rotated by impact or reaction of the fluid to be measured in a passage through a nozzle or nozzles under the pressure head of the fluid. A resistance or load member turns with the turbine impeller and is immersed in and acts on the fluid to be measured in a manner to afford a resistance torque so that the turbine impeller rotates at a moderate rate. The apparatus also includes a registering device, driven by the turbine impeller, which indicates the number of revolutions of the turbine impeller and, consequently, the total volume or quantity of fluid that passes through the apparatus.

U.S. Pat. No. 3,934,473 (Griffo) teaches a major improvement made to the basic turbine meter as described by Coleman above. Here, a second, counter-rotating turbine impeller is added to the meter. The fluid flow meter has two independently counter rotating turbine impellers in which fluid characteristics and/or upstream flow disturbances cause minimal variations in volume flow rate measurements by the meter as a result of fluid dynamic interaction between the impellers. The angular velocities of each of the impellers are sensed in a conventional manner after which the velocity signals are added to indicate a total volume throughput, and/or rate of flow.

In Svedeman et al., "Interim Report, NGV Fueling Station Technology Program: CNG Dispensing Development Goals," Gas Research Institute, Natural Gas Vehicles Technology Research Department, September 1994, the authors compare the potential to use diferent types of meters for filling vehicles with natural gas. Specifically, in Appendix D, a "Review of Current Gas Metering Technology," the authors compare meters having the following technologies: Coriolis effect, weighing systems, thermal, ultrasonic, turbine, vortex shedding, Coanda effect (fluidic meters), differential, criticavsonic nozzles, and positive displacement. These technologies were categorized as having either "good," "fair," or "poor" potential for measuring compressed natural gas (CNG). The authors give turbine meters, in general, a "air" rating for natural gas. The authors state that the pressure capability of turbine meters is adequate and the steady flow accuracy is good for CNG dispensing operations. However, the authors state, two issues required to be resolved are "the rangability over which turbine meters are accurate" and "the response of turbine meters to rapid transients." In this report, Coriolis meters, pyroelectric meters, and ultrasonic velocity meters were also generally categorized as "fair," while rotary positive displacement meters and sonic nozzle critical flow meters were categorized as "good."

In White, N., "Natural Gas for Vehicles, Research and Development Fund, Evaluation of Alternative Dispenser Meters," Gas Technology Canada Report, GTC Report NGV 200-8.43, June 1999, turbine flow meters were tested for CNG mass measurement where conditions were similar to a typical CNG fill station. In the testing, the turbine meter accuracy gradually degenerated over a four month test period due to the turbine bearings being slowly contaminated with heavy oil carried over from a compressor. The report also noted that turbine meters are sensitive to low flow rates and, therefore, the flow rates must be verified with proper turbine selection matched with appropriate flow restrictions and cut-off levels. The report also indicated that turbine meters work as well as Coriolis effect meters.

With specific reference to Coriolis meters, the present invention provides for the ability to use a turbine meter. Turbine meters are typically substantially less expensive than Coriolis meters and may also be more accurate.

None of this prior art addresses one of the major limitations of volume flow meters and density calculation. This limitation is the finite response rate of instrumentation. Pressure, temperature and flow rate all can change rapidly during the fill process, as much as 150 bar, 10° C., or 10 liters/second, in one second. Since the response rate of these instruments is typically on the order of one second, significant amounts of flow can be missed. The present invention addresses these limitations.

BRIEF SUMMARY OF THE INVENTION

The present invention is directed to a process for measuring a total mass of a pressurized fluid flowing through a conduit. The process includes the steps of measuring a first volume, a first temperature and a first pressure of the pressurized fluid flowing through the conduit during a first timed interval of a sequence of a plurality of timed intervals, calculating a first mass of the pressurized fluid flowing through the conduit during the first timed interval by applying the first temperature and the first pressure to an equation of state to determine a first density and multiplying the first density by the first volume to determine the first mass. The process further includes the steps of measuring a second volume, a second temperature and a second pressure of the pressurized fluid flowing through the conduit during a second timed interval of the sequence of the plurality of timed intervals, calculating a second mass of the pressurized fluid flowing through the conduit during the second timed interval by applying the second temperature and the second pressure to the equation of state to determine a second density and multiplying the second density by the second volume to determine the second mass. Finally, the process includes the step of calculating the total mass of the pressurized fluid through the conduit during the sequence of the plurality of timed intervals by summing the first and second masses of the pressurized fluid flowing through the conduit during the first and second timed intervals.

The process may be for measuring the total mass of a compressed hydrogen gas. The step of calculating a first mass may include calculating at least one of a predicted temperature, a predicted pressure and a predicted volume utilizing at least one value obtained in measuring the first temperature, the first pressure, and the first volume. This would substantially correct any error due to an instrument having a finite response rate.

Finally, the plurality of timed intervals vary may in length.

DETAILED DESCRIPTION OF THE INVENTION

The present invention is directed to an automated till process for filling vehicles with a pressurized fluid, preferably compressed hydrogen gas, $H_2$. A density calculation combined with a volume flow meter, preferably a turbine meter, to accurately measure the mass of the compressed fluid delivered to a vehicle, may be used.

Figure 1:
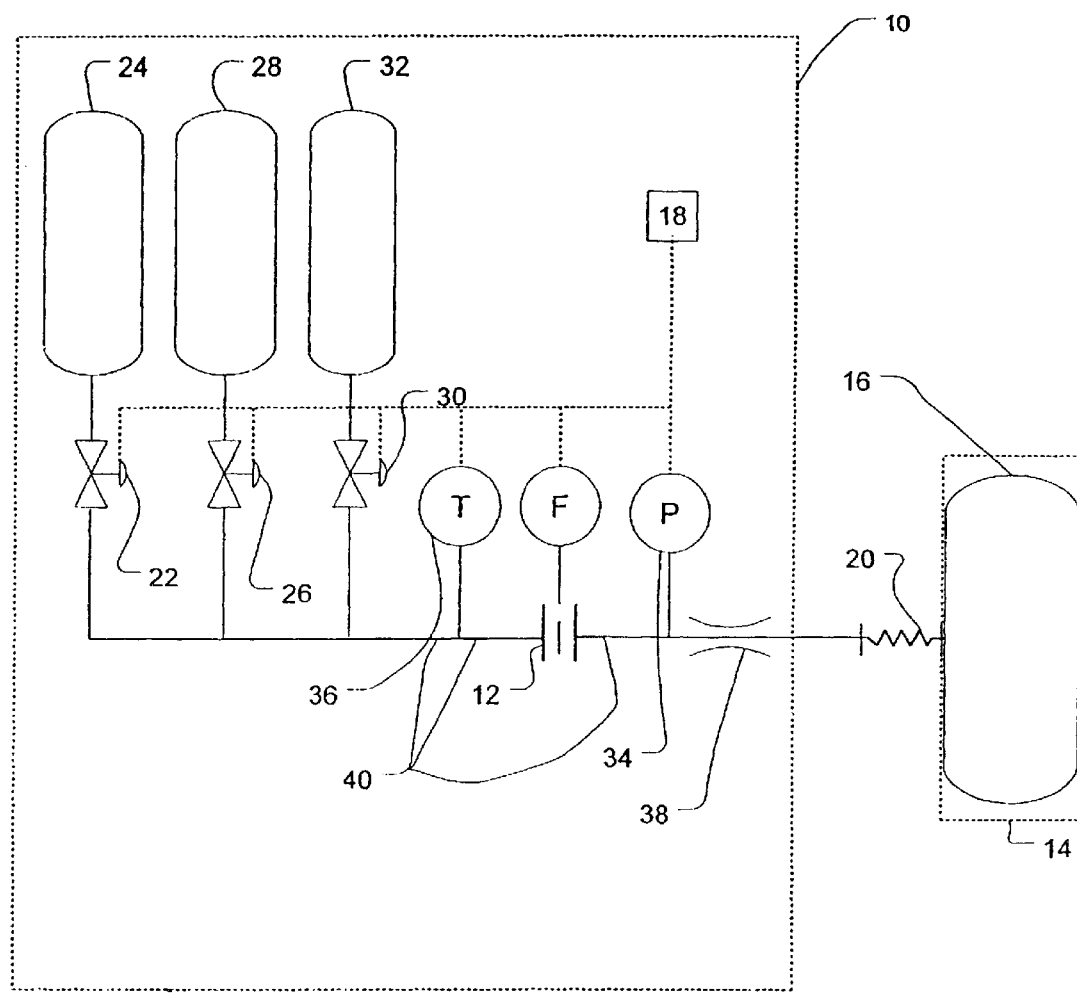
FIG. 1 is a schematic of a system for use with an automated fill process utilizing a volume flow meter and density calculation for compressed gas fuel dispensers in accordance with a first preferred embodiment of the present invention.

Referring now to the drawings wherein like part numbers refer to like elements throughout the several views, there is shown in FIG. 1 a pressurized fluid dispensing system, such as a hydrogen gas dispensing system 10, in accordance with one preferred embodiment of the present invention. The hydrogen gas dispensing system 10 utilizes the automated fill process of the present invention. In the hydrogen dispensing system 10, a gas volume flow meter 12 is used to fill a compressed gas tank 16, for example, of a vehicle 14. The gas volume flow meter 12 may be capable of measuring a gas with an inlet pressure of, for example, about 10 to 1000 bar, (e.g., about 348 bar), at a temperature of, for example, ambient temperature. The volume flow meter may be capable of measuring, for example, about 18 meters$^3$/minute to about 0.018 meters$^3$/minute of a gas. An Exact Flow, Inc., EMF16-DRG, flow meter would be appropriate.

The dispensing system 10 preferably consists of an automated fill controller 18 that controls the fill process. For example, a GE-9030 or a GE OCS200 or a custom controller would operate satisfactorily.

The fill process begins when the compressed gas tank 16 of a vehicle 14 is connected to the dispensing system 10 via supply tank-to-gas tank connector 20. The supply tank-to-gas tank connector 20 may be, for example, a Weh C1-18483 TK15 nozzle and a Weh C1-18481 TN1 receptacle. Other interchangeable connectors from, for example, Parker or OPW-Sherex would also be appropriate. The fill controller 18 opens supply tank valve 22 and/or regulator to provide high pressure gas stored in supply tank 24 to the vehicle compressed gas tank 16. The system may use, for example, a "cascade system" as known in the art of compressed gas filling systems. As in cascade systems, this process is repeated through successive banks of supply tank valves 22, 26, 30 (and/or regulators) and related supply tanks 24, 28, 32. Although three cascade banks are typically used in similar applications, a single supply tank or more than three supply tanks may be used, depending upon system requirements.

The supply tank valves 22, 26, 30 may be, for example, Butech K106-21-21 two-way valves which are capable of 10,000 psi (690 bar) or a Whitney SS-33VF4-31C. Storage pressure of the supply tanks 24, 28, 32 may be, for example, about 250 to 900 bar. The supply tanks 24, 28, 32 may be built to standard AMSE or DOT codes.

As flow of hydrogen gas, preferably $H_2$ gas, passes via gas supply conduit 40 through the gas volume flow meter 12, density of the gas is calculated using pressure and temperature measurements from pressure transducer 34 and temperature transducer 36 using an equation of state, as described below. Volumetric flow meters, in general, are capable of delivering volume data alone (rather than flow-rate data). For example, in a turbine meter, the number of rotations of a rotor may be directly proportional to the volume delivered to the flow meter such that volume of a gas can be determined. Of course, rather than a volumetric flow meter, any device capable of determining volume in a similar manner would be appropriate. The combination of volume (e.g., cubic inches) and density (e.g. kg/cubic inch), calculated from temperature and pressure measured in or adjacent to the gas volume flow meter 12 gives an accurate measure of the mass(e.g., kg). While not shown as such in FIG. 1, preferably, both the temperature transducer 36 and the pressure transducer 34 are located slightly upstream of the volume flow meter 12.

While, in general, any type of gas volume flow meter can be used to measure gas volume flow, for an accurate measurement, an advanced, counter rotating twin turbine type turbine meter is preferred.

Use of the gas volume flow meter 12, in combination with temperature and pressure measurement, provides for an accurate determination of the mass flow during the compressed gas (hydrogen) dispensing process. Such accuracy is not believed to be achievable by use of conventional flow meters typically used in gas dispensing, such as those based on Coriolis effect, at the pressure and flow rates required for hydrogen filling. The mass is calculated using the fill controller 18 using input data from the gas volume flow meter 12, the temperature transducer 36 and the pressure transducer 34. An equation of state is used which uses temperature, pressure, and volume data to determine mass.

One equation of state is the ideal gas law, P V=n Ru T. This can be restated as
P=ro R T or ro=P/(RT), where:
P=pressure (psia);
T=temperature (ER);
ro=density (lbm/ft$^3$);
Ru=universal gas constant=(10.73 psia ft$^3$)/(lb mol) (ER); and
R=Ru/M; in the case of hydrogen gas, R=5.322 psia ft$^3$/((lbm) (ER)).

At ambient conditions of P=14.696 psia and T=529.67 ER:
ro=14.696/(5.322*529.67)=0.005214 lb/ft$^3$ However, no gas has completely ideal properties. Actual gases are said to behave according to P V=Z n R T where Z=(ro$_{ideal}$/r$_{actual}$) and is referred to as the compressibility of the gas. For example, the actual density of H$_2$ at ambient conditions is 0.00521 lb/ft$^3$. Therefore, Z, at ambient conditions, is equal to 0.005214/0.00521=1.0008. While the effect of compressibility is negligible at ambient conditions, it does become significant at higher pressures.

There are many equations for estimating Z, Z may be a function of pressure and or temperature, depending upon the estimate. A common example of a function for Z is the Redlich-Kwong equation:

$$Zrk=1/(1-k)-(a/(b*R*T^{1.5}))*(k/1+k).$$

However, this equation does not yield acceptable results with respect to the conditions anticipated for use with the present invention.

Therefore, in a preferred embodiment, the present invention uses an equation based on a curve fit to NIST (National Institute of Standards and Technology) data and is accurate over the range of conditions expected for use with the present invention:

$$Z(P,T)=(5.622*10^{-21}*T^3-1.083*10^{-17}*T^2+7.019*10^{-15}*T-$$

$$1.530*10^{-12})*P^3+$$

$$(-9.190*10^{-17}*T^3+1.798*10^{-13}*T^2-$$

$$1.191*10^{-10}*T+2.679*10^{-08})*P^2+$$

$$(1.592*10^{-13}*T^3-2.621*10^{-10}*T^2$$

$$+9.602*10^{-08}*T+4.060*10^{-05})*P+$$

$$(1.455*10^{-12}*T^3-5.124*10^{-10}*T^2+-$$

$$1.836*10^{-06}*T+1.001).$$

For example, if P=5091 psia, and T=518.67 ER, the following is the design point for a 350 bar vessel:

$$Z(P,T)=(5.622*10^{-21}*518.67^3-1.083*10^{-17}$$

$$*518.67^2+7.019*10^{-15}*$$

$$518.67-1.530*10^{-12})*5091^3+(-9.190*10^{-17}*518.673$$

$$+1.798*10^{-13}*518.67^2-1.191$$

$$*10^{-10}*518.67+2.679*10^{-08})*5091^2+($$

$$1.592*10^{-13}*518.67^3-2.621*10^{-10}*$$

$$518.67^2+9.602*10^{-8}*518.67+4.060*10^{-05})*5091+(1.455*10^{-12}$$

$$*518.67^3-$$

$$5.124*10^{-10}*518.67^2-1.836*10^{-06}*518.67+1.001)=1.2266.$$

Therefore, $$Ro=5091/(5.322*518.67)/11.2266=1.503 \text{ lb/ft}^3$$

The NIST data reports a density of 1.503 lb/ft$^3$ for this temperature and pressure as well.

Pressures in the compressed gas tank 16 would range from, for example, about 10 bar or less at the beginning of a fill to about 438 bar or more at the end of a fill.

Optionally, a flow restricting orifice 38 downstream of the gas volume flow meter 12 may be used. This orifice 38 provides at least two benefits. First, it would prevent the gas volume flow meter 12, if it is a turbine meter, from "overspinning." Overspinning is a condition where too much flow goes through the meter and may cause bearing failure. Second, the orifice 38 would reduce the pressure fluctuation the gas volume flow meter 12 sees during the fill. By reducing the pressure fluctuation, the volumetric flow variation is also decreased, thereby increasing the accuracy of the flow measurement. The metering valve may be, for example, a Butech SFPMV46V. A simple orifice would also work.

Figure 2:
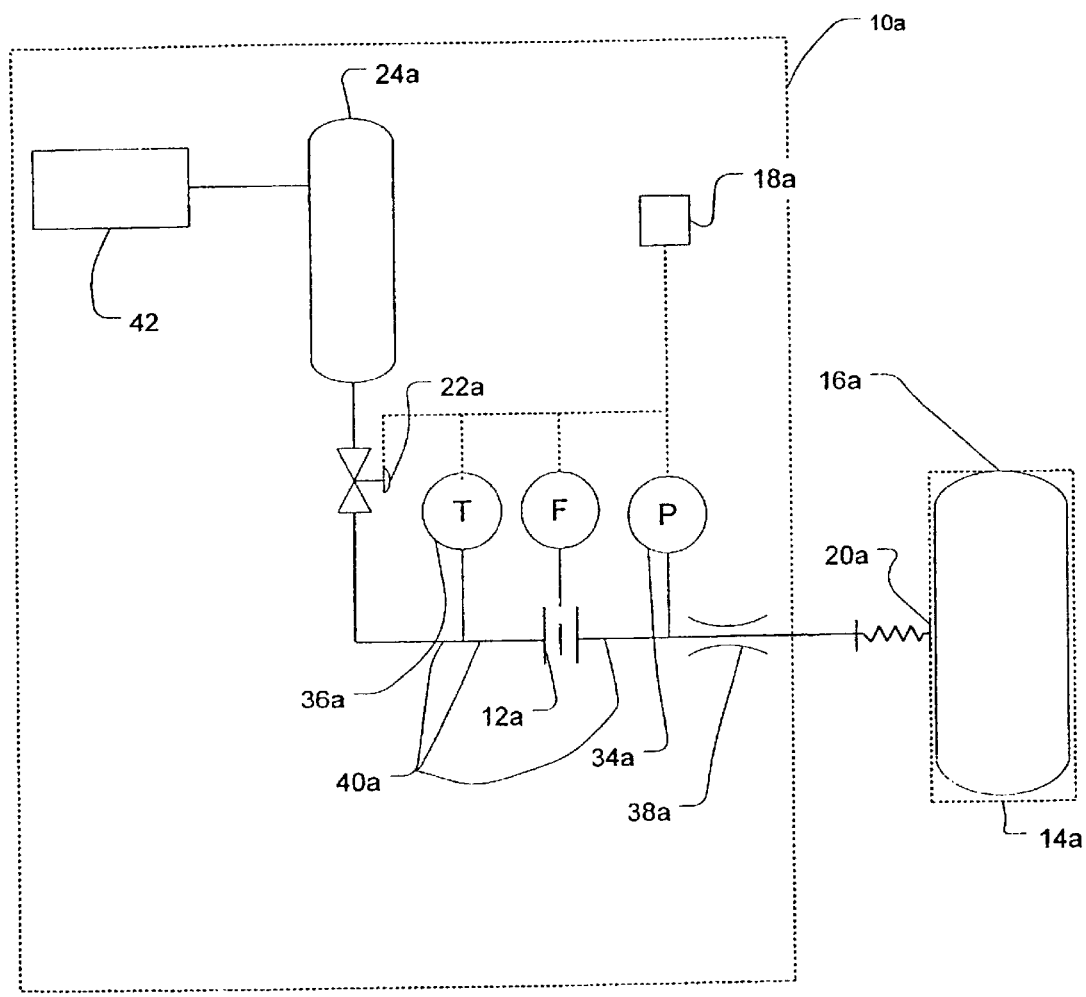
FIG. 2 is a schematic of a system for use with an automated fill process utilizing a volume flow meter and density calculation for compressed gas fuel dispensers in accordance with a second preferred embodiment of the present invention.

A second preferred embodiment of the dispensing system 10a of the present invention is depicted in FIG. 2. The dispensing system 10a is substantially identical to the dispensing system 10, except, rather than having a single or multiple supply tanks 24, 28, 32, a single supply tank 24a is fed by a compressor 42. The supply tank 24a acts a surge tank to equalize pressure variations caused by the gas compressor 42. For the sake of convenience, all elements in the dispensing system 10a of FIG. 2 that are identical to the elements in the dispensing system 10 of FIG. 1 have been given identical reference numbers with an "a" suffix added. For example, the temperature transducer 36 of the dispensing system 10 of FIG. 1 has been designated temperature transducer 36a for the identical temperature transducer in the dispensing system 10a of FIG. 2.

In use, the automated fill process of the present invention operates as follows. The dispensing system 10, 10a, as described above, is provided. The supply tank-to-gas tank connector 20, 20a is connected to the compressed gas tank 16, 16a of, for example, the vehicle 14, 14a. The supply tank valve 22, 22a provides the gas under pressure from the supply tank 24, 24a, through the gas supply conduit 40, 40a, to the compressed gas tank 16, 16a, operated, for example, by the fill controller 18, 18a. The supply tank valve 22, 22a allows gas to flow. A computer system, such as till controller 18, 18a receives data including temperature and pressure and volume (as data from the gas volume flow meter 34, 34a; e.g., number of rotations of meter turbine is proportional to volume) of gas flowing in the gas supply conduit 40, 40a at the gas volume flow meter 34, 34a. This data is substantially continuously obtained for successive discrete timed intervals, for example, a sequence of a plurality of timed intervals of twenty milliseconds each. That is, for each timed interval, there is known a pressure, temperature and volume of the gas passing through the gas supply conduit 40, 40a.

Optimally, the duration of each timed interval is as small as possible. However, in the preferred embodiment, the duration of each timed interval must be at least as long as the response time of the system. That is, the duration of each timed interval must be longer than the duration of time the system requires to take temperature, pressure and volume measurements and calculate a total mass delivered based on these measurements.

Density of gas flowing in the gas supply conduit 40, 40*a* at the gas volume flow meter is then calculated by the automated fill controller 18, 18*a* during each timed interval using the pressure and temperature measurements obtained for that timed interval using an equation of state. A mass of the gas flowing through the gas supply conduit 40, 40*a* for each timed interval is then calculated during the timed interval utilizing the density of gas flowing in the gas supply conduit 40, 40*a* during the timed interval and the volume of gas flowing through the gas supply conduit 40, 40*a* during the timed interval. Further masses of gas flowing during additional timed intervals are calculated and a total mass of gas delivered through the gas supply conduit 40, 40*a* during all timed intervals is summed by the automated fill controller 18.

For example, in a simple system wherein a sequence of timed intervals includes two timed intervals, a first temperature, a first pressure, and a first volume are measured for a pressurized fluid flowing through a conduit during a first timed interval. A first mass of the pressurized fluid is calculated for the first timed interval by applying the first temperature and first pressure to an equation of state (e.g., as described above) to determine a first density. The first density is multiplied by the first volume to determine the first mass. These steps are repeated for a second timed interval to obtain the second mass. The first and the second masses are summed to determine the total mass of pressurized fluid delivered during the first and second timed intervals.

Filling times for an average car-sized gas tank may be, for example, about two to five minutes. Buses having larger gas tanks may take, for example, ten to twenty minutes to fill.

One limitation of volume flow meters and density calculation is the finite response rate of instrumentation (which is a known time constant). Pressure, temperature and flow rate all can change rapidly during the fill process, as much as 150 bar, 10° C., or 10 liters/second in one second. Since the response rate of these instruments is typically on the order of one second, significant amounts of flow can be missed. Therefore, optionally, in the embodiments of the present invention, the fill controller 18, 18*a* may be programmed with a prediction equation or set of equations for predicting actual measurements for an input device with a known time constant. Time constants are typically around 1 second or longer for flow meters and thermocouples. Pressure transmitters may have faster time constants, for example, about 0.1 seconds, but may also be more than 1 second. An example of a set of prediction equations is:

$$A = 1 - \frac{1}{e^{\Delta t/t}}$$

$$Y_{e(t)} = \frac{Y_{m(t)} - (Y_{m(i-1)} + (Y_{e(t+1)} - Y_{m(t-1)} * A)}{A + Y_{e(i-1)}}$$

where:
- t=the time it takes a measurement to react to 63.2% of an input (the value of "t" is typically approximately one second);
- $Y_{m(t)}$=The current measurement;
- $Y_{m(i-f)}$=The previous measurement;
- $Y_{e(t)}$=The current estimate of the actual measurement;
- $Y_{e(i-1)}$=The previous estimate of the actual measurement;
- ▼t=The time between the current and the previous measurements; and
- A=Time Factor.

The above is one example of such a prediction equation. Any other equation known to those skilled in the art or which may be derived by those skilled in the art may also be used.

In the present invention, while sometimes desirable to reduce complexity, it is not necessary that all timed intervals be of equal duration. The timed intervals may vary based on, for example, current operating conditions such as flow rate or change in temperature or pressure from one timed interval to the next timed interval. The timed intervals may also vary based on the point in the filling process. For example, the timed intervals may be increased or decreased at a point near the end of the fill process.

While the above description is directed specifically to compressed gases, any fluid capable of being transferred by a unit process may be used.

Although illustrated and described herein with reference to specific embodiments, the present invention nevertheless is not intended to be limited to the details shown. Rather, various modifications may be made in the details within the scope and range of equivalents of the claims without departing from the spirit of the invention.

We claim:

1. A process for measuring a total mass of a pressurized fluid flowing through a conduit, comprising the steps of:

(a) measuring a first volume, a first temperature and a first pressure of the pressurized fluid flowing through the conduit during a first timed interval of a sequence of a plurality of timed intervals;

(b) calculating a first mass of the pressurized fluid flowing through the conduit during the first timed interval by applying the first temperature and the first pressure to an equation of state to determine a first density and multiplying the first density by the first volume to determine the first mass;

(c) measuring a second volume, a second temperature and a second pressure of the pressurized fluid flowing through the conduit during a second timed interval of the sequence of the plurality of timed intervals;

(d) calculating a second mass of the pressurized fluid flowing through the conduit during the second timed interval by applying the second temperature and the second pressure to the equation of state to determine a second density and multiplying the second density by the second volume to determine the second mass; and (e) calculating the total mass of the pressurized fluid through the conduit during the sequence of the plurality of timed intervals by summing the first and second masses of the pressurized fluid flowing through the conduit during the first and second timed intervals.

2. The process of claim 1, wherein the process is for measuring the total mass of a compressed hydrogen gas.

3. The fill process of claim 1, wherein the step of calculating a first mass comprises calculating at least one of a predicted temperature, a predicted pressure and a predicted volume utilizing at least one value obtained in measuring the first temperature, the first pressure, and the first volume, whereby an error due to an instrument having a finite response rate is substantially corrected.

4. The process of claim 1, wherein the plurality of timed intervals vary in length.

* * * * *